United States Patent
Tanaka et al.

[19]

[11] Patent Number: 5,861,986
[45] Date of Patent: Jan. 19, 1999

[54] ZOOM FINDER OPTICAL SYSTEM

[75] Inventors: Katsuto Tanaka, Kawachinagano; Kyoko Yamaguchi, Sakai, both of Japan

[73] Assignee: Minolta Co., Ltd., Osaka, Japan

[21] Appl. No.: 878,540

[22] Filed: Jun. 19, 1997

Related U.S. Application Data

[63] Continuation of Ser. No. 354,521, Dec. 13, 1994, abandoned.

[30] Foreign Application Priority Data

Dec. 17, 1993 [JP] Japan ................................. 5-317871

[51] Int. Cl.⁶ ................................................ G03B 13/10
[52] U.S. Cl. ........................ 359/431; 359/432; 359/676
[58] Field of Search .................... 359/362, 421–422, 359/431–435, 676–678, 686, 708, 715, 754, 771, 781, 833; 354/152, 155, 199, 219–225; 396/373–386

[56] References Cited

U.S. PATENT DOCUMENTS

| | | | |
|---|---|---|---|
| 4,969,723 | 11/1990 | Kato et al. ............................ | 354/221 |
| 5,034,763 | 7/1991 | Inabata .................................. | 359/431 |
| 5,148,308 | 9/1992 | Miyauchi .............................. | 359/432 |
| 5,191,477 | 3/1993 | Abe et al. ............................. | 359/695 |
| 5,206,675 | 4/1993 | Miyauchi et al. .................... | 359/833 |
| 5,257,129 | 10/1993 | Morooka et al. .................... | 359/432 |
| 5,359,377 | 10/1994 | Kamo ................................... | 396/379 |
| 5,410,430 | 4/1995 | Ito et al. .............................. | 359/422 |
| 5,448,411 | 9/1995 | Morooka ............................. | 359/432 |
| 5,555,431 | 9/1996 | Kim ..................................... | 359/676 |
| 5,627,618 | 5/1997 | Kasai et al. .......................... | 396/379 |

FOREIGN PATENT DOCUMENTS

| | | |
|---|---|---|
| 1116616 | 5/1989 | Japan . |
| 3487803 | 4/1991 | Japan . |
| 451108 | 2/1992 | Japan . |

*Primary Examiner*—Thong Nguyen
*Attorney, Agent, or Firm*—Price, Gess & Ubell

[57] ABSTRACT

A zoom finder optical system of real image type of the present invention is provided with an objective lens system of a positive refractive power, a condenser lens of a positive refractive power and an eyepiece system of a positive refractive power from an object side. The objective lens system includes from the object side a first lens unit of negative refractive power, a second lens unit of a negative refractive power, a third lens unit of a positive refractive power and a fourth lens unit of a positive refractive power.

31 Claims, 7 Drawing Sheets

H=1.5mm
— e LINE
-1.00  1.00
(diopter)
SPHERICAL ABERRATION

θ=33.29°
—— DS
--- DT
-1.00  1.00
(diopter)
ASTIGMATISM

θ=33.29°
-5.00  5.00
(%)
DISTORTION

H=1.5mm
— e LINE
-1.00  1.00
(diopter)
SPHERICAL ABERRATION

θ=19.39°
—— DS
--- DT
-1.00  1.00
(diopter)
ASTIGMATISM

θ=19.39°
-5.00  5.00
(%)
DISTORTION

H=1.5mm
— e LINE
-1.00  1.00
(diopter)
SPHERICAL ABERRATION

θ=10.68°
—— DS
--- DT
-1.00  1.00
(diopter)
ASTIGMATISM

θ=10.68°
-5.00  5.00
(%)
DISTORTION

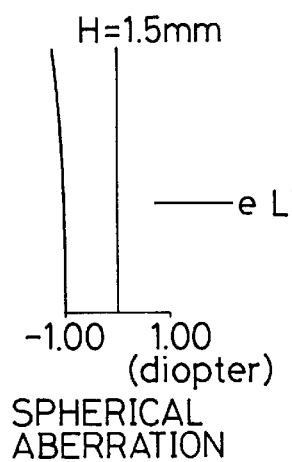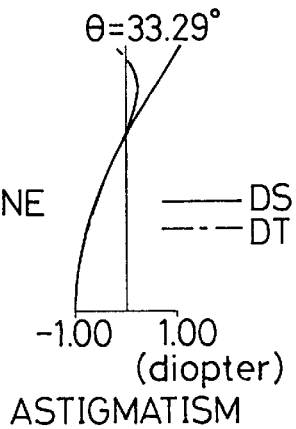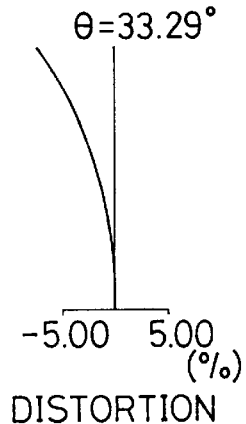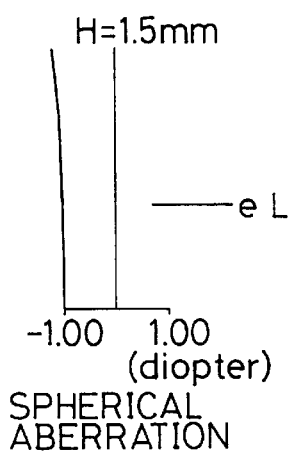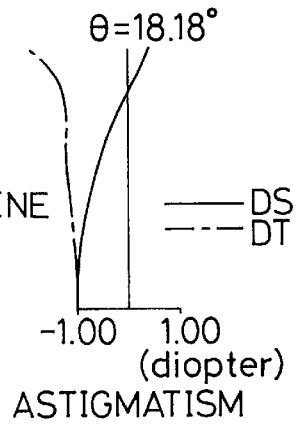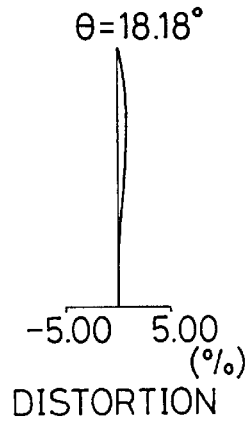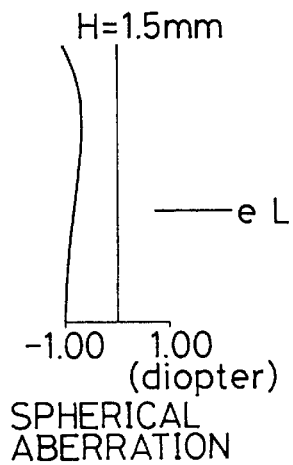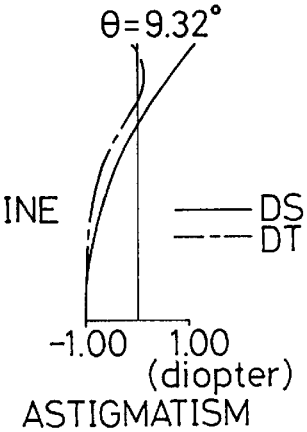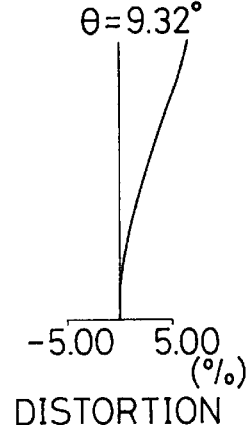

H=1.5mm
— e LINE
-1.00  1.00
(diopter)
SPHERICAL ABERRATION

θ=33.29°
— DS
--- DT
-1.00  1.00
(diopter)
ASTIGMATISM

θ=33.29°
-5.00  5.00
(%)
DISTORTION

H=1.5mm
— e LINE
-1.00  1.00
(diopter)
SPHERICAL ABERRATION

θ=19.39°
— DS
--- DT
-1.00  1.00
(diopter)
ASTIGMATISM

θ=19.39°
-5.00  5.00
(%)
DISTORTION

H=1.5mm
— e LINE
-1.00  1.00
(diopter)
SPHERICAL ABERRATION

θ=10.68°
— DS
--- DT
-1.00  1.00
(diopter)
ASTIGMATISM

θ=10.68°
-5.00  5.00
(%)
DISTORTION

ZOOM FINDER OPTICAL SYSTEM

This is a continuation of application Ser. No. 08/354,521, filed on Dec. 13, 1994, now abandoned.

BACKGROUND OF THE INVENTION

1. Field of the Invention

The present invention relates to a zoom finder optical system, and more specifically, to a real-image zoom finder optical system for use in a lens shutter camera and the like.

2. Description of the Prior Art

In recent years, with the appearance of smaller-size, higher-zoom-ratio and wider-angle (because of the popularity of panorama-size photos) lens shutter cameras, similar specifications are required for finder optical systems used in the lens shutter cameras. Specifically, wide-angle, high-zoom-ratio (ranging from wide angle to telephoto) and small-size finder optical systems are required.

The conventionally used high-zoom-ratio finder optical system is a real-image finder optical system comprising from the object side a positive objective lens system, a positive condenser lens and a positive eyepiece system. As a zoom finder optical system of this type, an optical system has been proposed having an objective lens system provided with a special feature.

For example, with a zoom finder optical system of a type where the objective lens system is of positive, negative, positive configuration and zooming is performed by moving the second and third lens units (Japanese Laid-open Patent Application No. H3-87803), a compact finder optical system with a high zoom ratio is realized.

However, in view of the realization of a wide angle (corresponding to an angle of view of 28 mm) and a high zoom ratio (3× or higher), in an objective lens system whose first lens unit has a positive refractive power, although an appropriate refractive power arrangement is obtained paraxially, in actuality, the necessary effective aperture of the first lens unit is too large at the shorter focal length condition (wide angle condition), so that it is impossible to secure the necessary thickness of the edge of the positive lens.

Therefore, to realize a wide angle and a high zoom ratio, it is desirable for the first lens unit of the objective lens system to have a negative refractive power. As a zoom finder optical system of such a type, optical systems are known which are of negative, positive, positive configuration (Japanese Laid-open Patent Application No. H1-116616) or of negative, positive configuration where zooming is performed by moving the first and second lens units constituting the objective lens system.

Generally, lenses provide a light beam having a large angle of view with a large amount of aberration. In particular, distortion is generated in proportion to the cube of the angle of view. Therefore, since the angle of view is large at the shorter focal length condition, a large negative distortion is generated by the first lens unit. Conversely, at the longer focal length condition (telephoto condition), since the angle of view of the light beam incident on the first lens unit is small, distortion is hardly generated. For example, in the case of 3× zoom, the angle of view is also tripled, so that distortion generated by the first lens unit at the longer focal length condition is 1/27 times that at the shorter focal length condition.

Because of this, in the optical systems of the type having the objective lens system of negative, positive, positive configuration (Japanese Laid-open Patent Application No. H1-116616) or of negative, positive configuration, a large negative distortion is generated by the first lens unit due to the increase in angle of view at the shorter focal length condition, so that the difference between distortion at the shorter focal length condition and distortion at the longer focal length condition (hereinafter referred to as "distortion difference") increases to a impermissible level. Thus, if the realization of a wide angle and a high zoom ratio is intended with this type, a large negative distortion is generated by the first lens unit only at the shorter focal length condition, so that aberration correction is difficult.

The present applicant disclosed in Japanese Laid-open Patent Application No. H4-51108 a zoom finder optical system of a type where the objective lens system is of negative, negative, positive configuration and zooming is performed by moving the second and third lens units.

This negative, negative, positive type objective lens system is of an arrangement where the refractive power is divided into two by dividing into two units the negative first lens unit of the negative, positive type objective lens system, so that the effect of distortion generated at the shorter focal length condition is restrained to reduce the distortion difference. This is because in the negative, negative, positive type objective lens system, the distortion generated by the first lens unit decreases since the refractive power of the first lens unit is small compared to the negative, positive type objective lens system. In addition, in the negative, negative, positive type objective lens system, since the angle of view is reduced by the first lens unit, the distortion generated by the second lens unit is also reduced.

As described above, the objective lens system of negative, negative, positive configuration can realize the wide angle. However, since the refractive power of the third lens unit increases too much if the high zoom ratio is realized, a large aberration is generated at the longer focal length condition where the light beam passes the outermost periphery of the lens (in other words, the aperture of the entrance pupil of the lens is large). In particular, spherical aberration is generated in proportion to the cube of the entrance pupil.

SUMMARY OF THE INVENTION

An object of the present invention is to provide a wide-angle and high-zoom-ratio zoom finder optical system where aberrations are excellently corrected.

A zoom finder optical system of a real image type of the present invention is provided with an objective lens system of a positive refractive power, a condenser lens of a positive refractive power and an eyepiece system of a positive refractive power from an object side. The objective lens system includes from the object side a first lens unit of negative refractive power, a second lens unit of a negative refractive power, a third lens unit of a positive refractive power and a fourth lens unit of a positive refractive power.

BRIEF DESCRIPTION OF THE DRAWINGS

This and other objects and features of this invention will become clear from the following description, taken in conjunction with the preferred embodiments with reference to the accompanied drawings in which:

FIGS. 7A to 7C show aberrations of the second embodiment at the shortest focal length condition;

FIGS. 7D to 7F show aberrations of the second embodiment at the middle focal length condition;

FIGS. 7G to 7I show aberrations of the second embodiment at the longest focal length condition;

DESCRIPTION OF THE PREFERRED EMBODIMENTS

A zoom finder optical system of the present invention is a real-image zoom finder optical system comprising from the object side a positive objective lens system, a positive condenser lens and a positive eyepiece system. The objective lens system includes from the object side a negative first lens unit, a negative second lens unit, a positive third lens unit and a positive fourth lens unit. During zooming, the second and third lens units are moved along the optical axis.

Thus, the zoom finder optical system of the present invention has an objective lens system of a negative, negative, positive, positive configuration from the object side realized based on the above-mentioned real-image zoom finder optical system (Japanese Laid-open Patent Application No. H4-51108) having the objective lens system of negative, negative, positive configuration by adding thereto a positive lens system as the fourth lens unit on the eyepiece side thereof.

Figure 1:
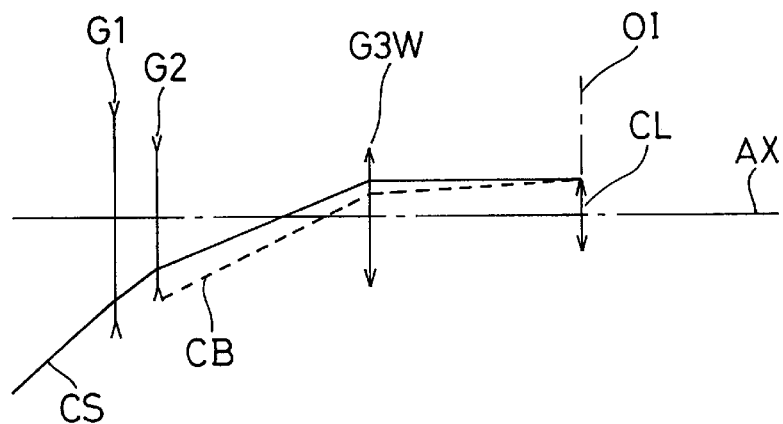
FIG. 1 shows the refractive power arrangement of an objective lens system and a condenser lens in a conventional finder optical system at the shorter focal length condition.
Figure 2:
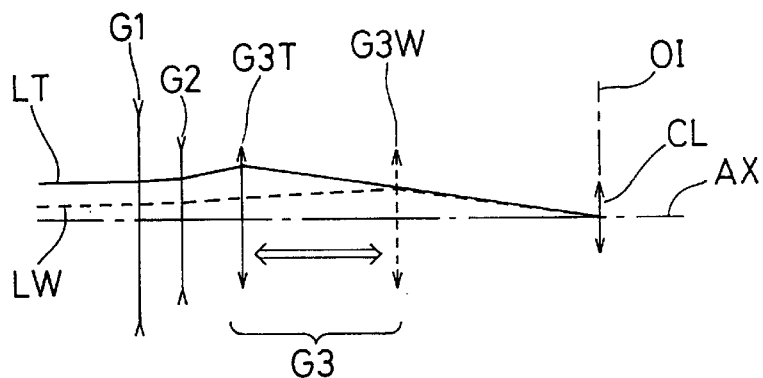
FIG. 2 shows the refractive power arrangement of an objective lens system and a condenser lens in a conventional finder optical system at the longest focal length condition and at the shortest focal length condition.
Figure 3:
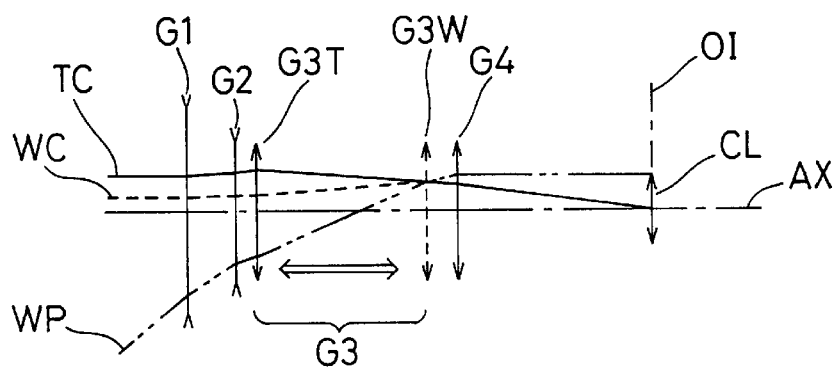
FIG. 3 shows the refractive power arrangement of an objective lens system and a condenser lens in a finder optical system of the present invention at the longest focal length condition and at the shortest focal length condition.

The present invention will be described with reference to FIGS. 1 to 3 by comparing it with the zoom finder optical system having the objective lens system of negative, negative, positive configuration. FIG. 1 shows the refractive power arrangement of an objective lens system and a condenser lens CL at the shorter focal length condition in a zoom finder optical system having an objective lens system (including first to third lens units G1 to G3W) of negative, negative, positive configuration. In FIG. 1, a light beam CS when the refractive power of the condenser lens CL is small is represented by the solid line, and a light beam CB when the refractive power of the condenser lens CL is large is represented by the broken line. FIG. 2 shows the refractive power arrangement of an objective lens system and a condenser lens CL at the shorter focal length condition and at the longer focal length condition in a zoom finder optical system having an objective lens system (including first to third units G1 to G3) of negative, negative, positive configuration. In FIG. 2, a central light beam LT at the longer focal length condition is represented by the solid line, and a central light beam LW at the shorter focal length condition is represented by the broken line. FIG. 3 shows the refractive power arrangement of an objective lens system and a condenser lens CL at the shorter focal length condition and at the longer focal length condition in a zoom finder optical system having an objective lens system (including first to third lens units G1 to G3) of negative, negative, positive, positive configuration. In FIG. 3, a central light beam TC at the longer focal length condition is represented by the solid line, a central light beam WC at the shorter focal length is represented by the broken line, and a peripheral light beam WP at the shorter focal length condition is represented by the chain double-dashed line.

In the zoom finder optical system having the negative, negative, positive type objective lens system, zooming toward the telephoto side is performed by moving the third lens unit G3 toward the object side along the optical axis AX, and the dioptric power is adjusted by moving the first or second lens unit G1 or G2 along the optical axis AX (see FIG. 2). In this arrangement, in view of the realization of a wide angle and a high zoom ratio, although the wide angle can be realized, aberration (spherical aberration, etc.) is generated by the third lens unit G3T at the longer focal length condition as mentioned previously if the zoom ratio is increased.

By increasing the refractive power of the condenser lens CL, it is possible to cause the peripheral light of an image formed surface OI of the objective lens system to pass in the vicinity of the center thereof as shown by the broken line CB in FIG. 1. However, if the refractive power of the condenser lens CL is increased, the light beam CB which passes through the first and second lens units G1 and G2 at the shorter focal length condition passes the periphery thereof, the necessary effective apertures of the first and second lens units G1 and G2 increase.

Since the light beam CB passes the periphery of the lens, the amount of aberrations generated by the first and second lens units G1 and G2 increases. Generally, the lens provides light beams passing its periphery with a large amount of aberrations although it does not have any bad effect on light beams passing in the vicinity of its center. Therefore, if the luminous flux passes peripheral portions of the first and second lens units G1 and G2 at the shorter focal length condition, a large amount of aberrations are generated. Thus, it is impossible to largely increase the refractive power of the condenser lens CL.

As shown in FIG. 2, the condensing by the condenser lens CL does not work on the central light beams LT and LW of the image formed surface OI associated with spherical aberration. For this reason, at the longer focal length condition, the central light beam LT spreads to the periphery of the third lens unit G3T, so that a large spherical aberration (spherical aberration is generated in proportion to the cube of the aperture of the entrance pupil) is generated.

According to the present invention, as shown in FIG. 3, by adding a positive optical system as the fourth lens unit G4 and by decreasing the refractive power of the third lens unit G3, the necessary lens aperture of the third lens unit G3 is decreased at the longer focal length condition while the necessary lens apertures of the first and second lens units G1 and G2 are maintained to be substantially the same as that of prior art at the shorter focal length condition. Thereby, the generation of aberrations (spherical aberration, etc.) by the third lens unit G3T can be restrained at the longer focal length condition.

The optical system of the present invention is not an optical system obtained merely by dividing the third lens unit G3 of the above-mentioned negative, negative, positive type objective lens system. The advantages of the present invention cannot be obtained by such an arrangement. According to the present invention, the third lens unit G3 and the fourth lens unit G4 are located substantially at the same position at the shortest focal length condition, so that the refractive power arrangement and optical paths at the shortest focal length condition are substantially the same as those of the negative, negative, positive type objective lens system (FIG. 2). An optical system obtained by dividing the third lens unit G3 into two in the negative, negative, positive type objective lens system shown in FIG. 2 is equivalent in zoom arrangement to an optical system where the fourth lens unit G4 moves together with the third lens unit G3 during zooming in FIG. 3, so that the effective lens aperture of the fourth lens unit G4 increases together with the effective lens aperture of the third lens unit G3 during zooming from the shorter focal length condition to the longer focal length condition. As a result, the amount of aberrations generated by the third and fourth lens units G3 and G4 increases. For example, a large spherical aberration is generated in proportion to the cube of the aperture of the entrance pupil as mentioned above. On the contrary, according to the present invention, as is apparent from FIG. 3, light is condensed at the fourth lens unit G4 at the longer focal length condition, so that the effective lens aperture of the third lens unit G3T is considerably small. As a result, the amount of aberrations generated by the third lens unit G3 is restrained.

As mentioned above, the present invention is characterized in that a positive lens unit is further arranged on the image side of the conventional negative, negative, positive type objective lens system. In this case, it is the most desirable that the most image side positive fourth lens unit G4 is fixed on the optical axis during zooming. However, even if the fourth lens unit G4 is slightly moved, advantages substantially the same as those of the case where the fourth lens unit G4 is fixed are obtained. However, the movement of the fourth lens unit G4 tends to cause the following problem.

When the fourth lens unit G4 is moved toward the object side by a movement amount different from that of the third lens unit G3 from the shorter focal length condition to the longer focal length condition, the luminous flux is spread by the third lens unit G3, so that the closer the movement amount of the fourth lens unit G4 is to the movement amount of the third lens unit G3, the more aberrations are generated. As a result, the advantages of the present invention are reduced.

When the fourth lens unit G4 is moved toward the pupil side from the shorter focal length condition to the longer focal length condition, although the advantages of the present invention are obtained, it tends to be impossible to secure a space for providing an erecting optical system (e.g. Porro prism) necessary for the real-image finder between the fourth lens unit G4 and the image formed surface OI. If the movement of the fourth lens unit G4 is not restrained by the erecting optical system, the length of the entire finder optical system increases due to the movement of the fourth lens unit G4.

For this reason, it is desired not to move the fourth lens unit G4 excessively. However, advantages substantially the same as those obtained when the fourth lens unit G4 is fixed are obtained even when the fourth lens unit G4 is slightly moved.

The fourth lens unit G4 can be realized also by adding a spherical surface (or an aspherical surface) to the incident surface of the erecting optical system. By integrating the fourth lens unit G4 with the erecting optical system in this manner, the object of the present invention is achieved without the compactness of the optical system being deteriorated.

If the refractive power of the third lens unit G3 is weak, the movement amount for zooming increases too much, so that the compactness deteriorates. If the third lens unit G3 is constituted by a single lens, the positive refractive power increases too much, so that a large aberration is generated. Therefore, it is preferable that the third lens unit G3 includes a plurality of lens elements among which the refractive power is divided.

To prevent the increase in number of lens elements, it is preferable that the third lens unit G3 includes at least one B-type aspherical surface where the positive refractive power decreases from the center to the edge along the height (B-type aspherical surface is an aspherical surface where the curvature decreases from the center to the edge along the height in the case of convex surfaces and an aspherical surface where the curvature increases from the center to the edge along the height in the case of concave surfaces, the same applies hereinafter).

If the refractive power of the second lens unit G2 is too weak, the movement amount for zooming increases too much, so that the compactness is deteriorated. If the negative refractive power of the second lens unit G2 is too strong, a negative distortion is generated at the shorter focal length condition where the luminous flux passes the periphery of the second lens unit G2, and a large spherical aberration is generated at the longer focal length condition where the luminous flux passing through the center of the image formed surface IO passes the periphery of the second lens unit G2. To remove these aberrations, it is preferable to provide in the second lens unit G2 at least one A-type aspherical surface where the negative refractive power decreases from the center to the edge along the height (A-type aspherical surface is an aspherical surface where the curvature increases from the center to the edge along the height in the case of convex surfaces and an aspherical surface where the curvature decreases from the center to the edge along the height in the case of concave surfaces, and the same applies hereinafter).

In the first and second lens units G1 and G2 having angles of view which are greater at the shorter focal length condition, the shorter the focal length is, the larger the negative distortion generated is. On the contrary, in the third and fourth lens units G3 and G4 having small angles of view, a small positive distortion is generated. Therefore, the level of the negative distortion increases as a whole at the shorter focal length condition, while a substantially well-balanced condition is obtained at the longer focal length condition since the incident angles of view at the first and second lens units G1 and G2 decrease. In the correction of the negative distortion by the aspherical surface (A type) of the second lens unit G2, since other aberrations also increase, the aberration correction is insufficient. For this reason, even after the aberration correction at the second lens unit G2, the value of the negative distortion increases in the entire zoom range. Therefore, it is preferable to correct aberrations by further providing the B-type aspherical surface in the fourth lens unit G4.

While the correction of distortion at the second lens unit G2 is the correction of only the negative distortion at the shorter focal length condition, the correction of distortion at the fourth lens unit G4 is the correction of distortion of the same direction both at the shorter focal length condition and at the longer focal length condition. Therefore, if the B-type aspherical surface is used in the fourth lens unit G4, since the correction is made toward the positive distortion as a whole irrespective of zooming (wide angle/telephoto), the level of the negative distortion at the shorter focal length condition and the level of the positive distortion at the longer focal length condition are allotted to be well-balanced so as not to be inconspicuous.

Generally, if the size of a finder is reduced, aberrations are deteriorated, so that it is difficult to increase the zoom ratio. Conversely, if the size of the finder is increased, the aperture of the entrance pupil relatively decreases since the aperture of the human eye does not change. Generally, aberrations decrease as the entrance pupil decreases; in particular, aberrations decrease in proportion to the cube of the aperture of the entrance pupil as mentioned above. Then, since other aberrations can excellently be corrected accordingly, the permissible amount of aberrations increases. Thus, according to the present invention, a wide angle and a high zoom ratio can be obtained with aberrations being excellently corrected without any need to increase the size of the finder, so that a zoom finder optical system can be realized which is relatively compact compared to the negative, negative, positive type objective lens system.

Subsequently, the refractive power distribution will be described. In the present invention, it is necessary to appropriately allot the refractive power to each lens unit. First, the following condition (1) is preferably fulfilled:

$$1 \leq \frac{f_1}{f_2} \leq 10 \qquad (1)$$

where $f_1$ is a focal length of the first lens unit G1 and $f_2$ is a focal length of the second lens unit G2.

In the condition (1), when $f_1/f_2<1$, the refractive power of the second lens unit G2 which is moved for zooming is insufficient, so that the movement amount of the second lens unit G2 increases. As a result, the compactness is deteriorated. When $f_1/f_2>10$, the effect of the negative refractive power of the first lens unit G1 is insufficient, so that the same problem as that of the above-mentioned negative, positive, positive objective lens system is caused.

Further, the following condition (2) is preferably fulfilled:

$$0.1 \leq \frac{f_3}{f_4} \leq 1 \qquad (2)$$

where $f_3$ is a focal length of the third lens unit G3 and $f_4$ is a focal length of the fourth lens unit G4.

In the condition (2), when $f_3/f_4<0.1$, the effect of the positive power of the fourth lens unit G4 is insufficient, so that the same problem as that of the negative, negative, positive objective lens system is caused. When $f_3/f_4>1$, the movement amount of the third lens unit G3 increases too much, so that the compactness is deteriorated and the finder magnification decreases.

Numerical data of first to third embodiments of the present invention are shown in Tables 1 to 3. In each table, $\theta$ is a half angle of view, $\Gamma$ is a finder magnification, ri (i=1, 2, 3, ...) is a radius of curvature of an ith surface counted from the object side, di (i=1, 2, 3, ...) is an axial distance of an ith surface counted from the object side, and Ni (i=1, 2, 3, ...) and vi (i=1, 2, 3, ...) are a refractive index and an Abbe number to the e-line of an ith lens surface counted from the object side, respectively. Finder magnifications and variable distances T1 to T2 which vary with zooming, and values corresponding to the conditions (1) and (2) are also shown.

In the tables, the surfaces marked with asterisks (*) are aspherical and defined by the following expression:

$$x = \frac{C_0 \cdot y^2}{1 + (1 - \epsilon \cdot C_0^2 \cdot y^2)^{\frac{1}{2}}} + \sum_{i=1} Ai y^i$$

where x is a displacement amount from the vertex of an aspherical surface along the optical axis at a distance y, y is a distance in a direction vertical to the optical axis, $C_0$ is a curvature at the vertex of the aspherical surface, $\epsilon$ is a conic constant, and Ai is an ith-order aspherical coefficient.

Figure 4A:
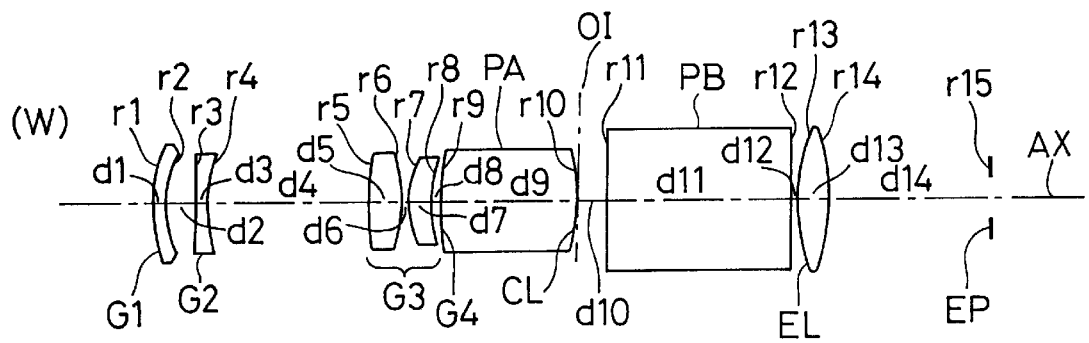
FIGS. 4A to 4C are cross-sectional views showing the lens arrangement of a first embodiment of the present invention at the shortest focal length condition, at the middle focal length condition and at the longest focal length condition, respectively.
Figure 4B:
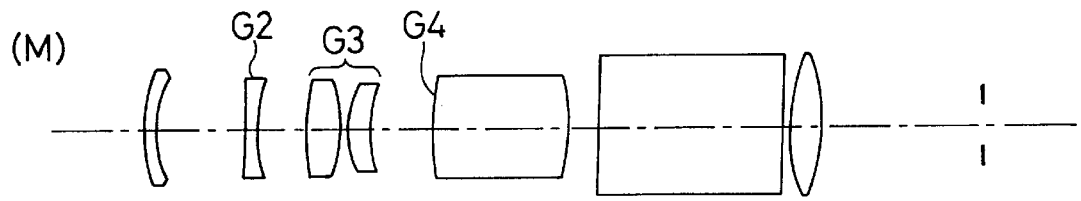
Figure 4C:
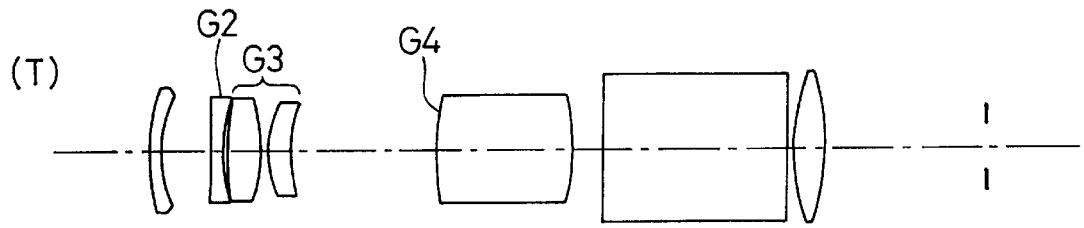
Figure 5A:
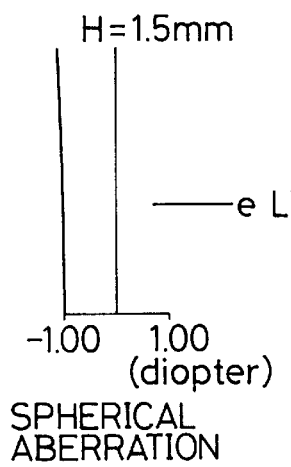
FIGS. 5A to 5C show aberrations of the first embodiment at the shortest focal length condition.
Figure 5B:
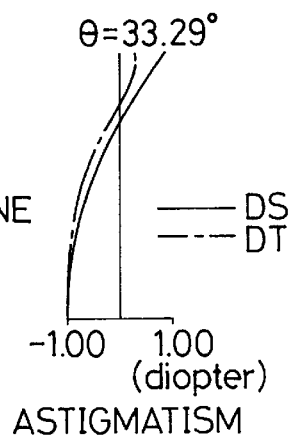
Figure 5C:
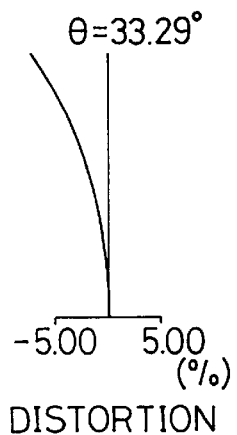
Figure 5D:
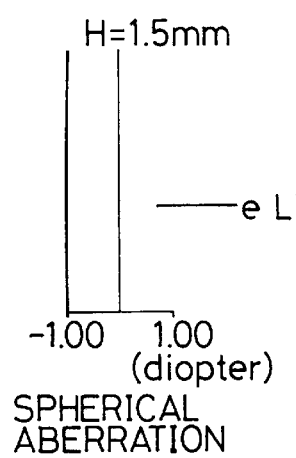
FIGS. 5D to 5F show aberrations of the first embodiment at the middle focal length condition.
Figure 5E:
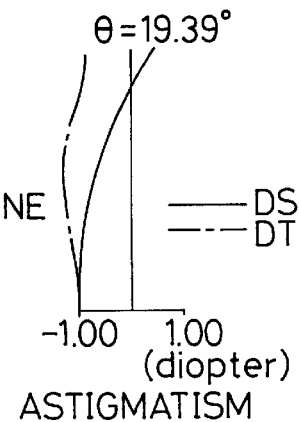
Figure 5F:
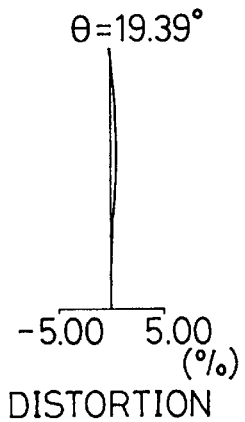
Figure 5G:
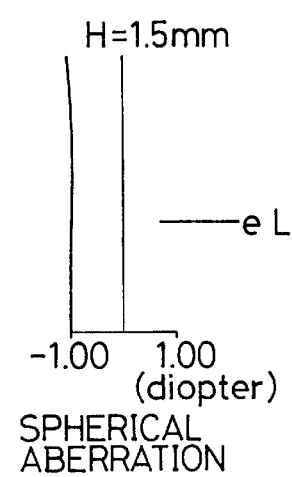
FIGS. 5G to 5I show aberrations of the first embodiment at the longest focal length condition.
Figure 5H:
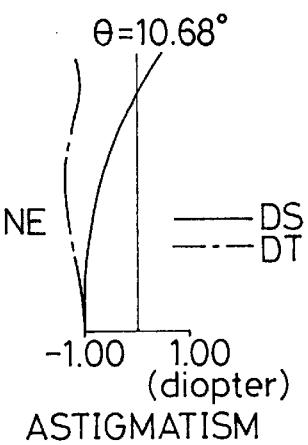
Figure 5I:
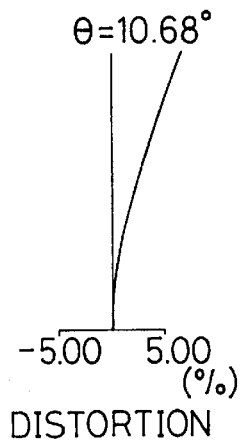
Figure 6A:
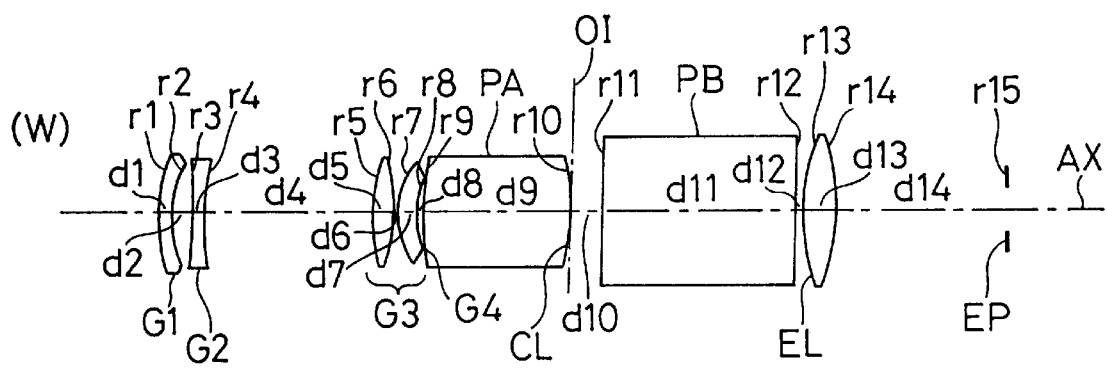
FIGS. 6A to 6C are cross-sectional views showing the lens arrangement of a second embodiment of the present invention at the shortest focal length condition, at the middle focal length condition and at the longest focal length condition, respectively.
Figure 6B:
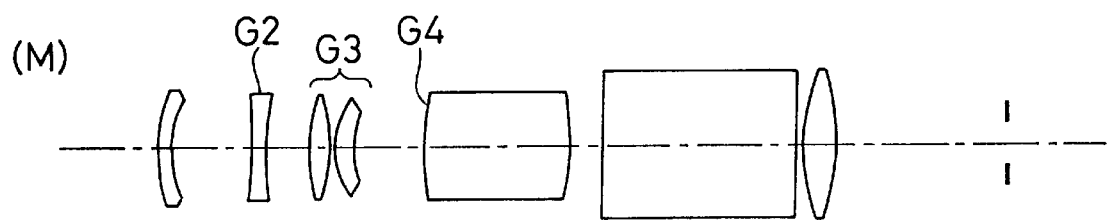
Figure 6C:
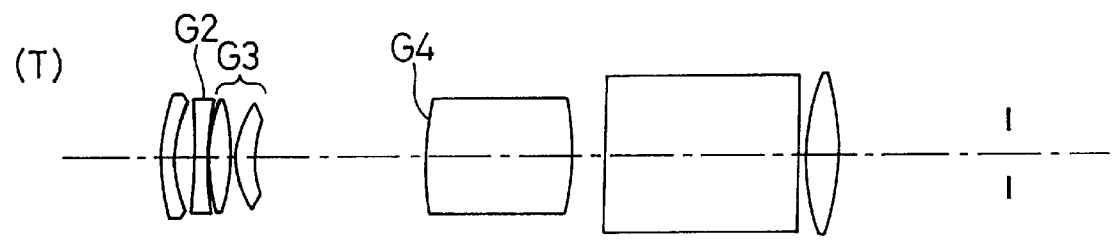
Figure 8A:
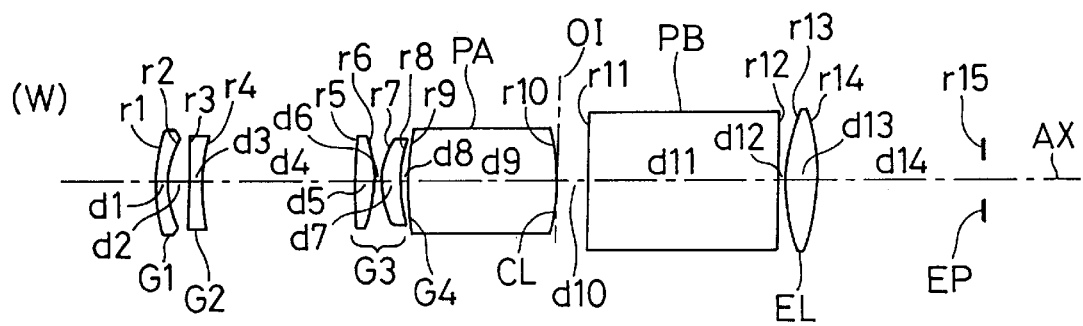
FIGS. 8A to 8C are cross-sectional views showing the lens arrangement of a third embodiment of the present invention at the shortest focal length condition, at the middle focal length condition and at the longest focal length condition, respectively.
Figure 8B:
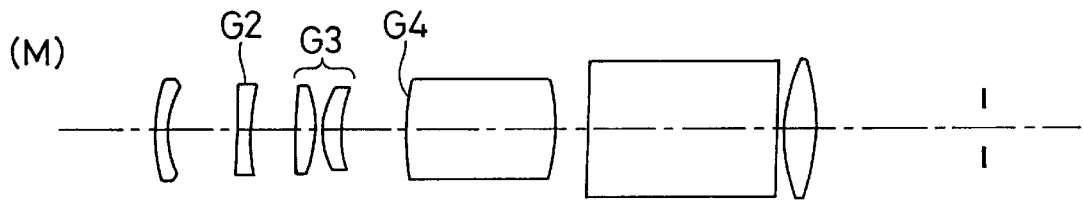
Figure 8C:
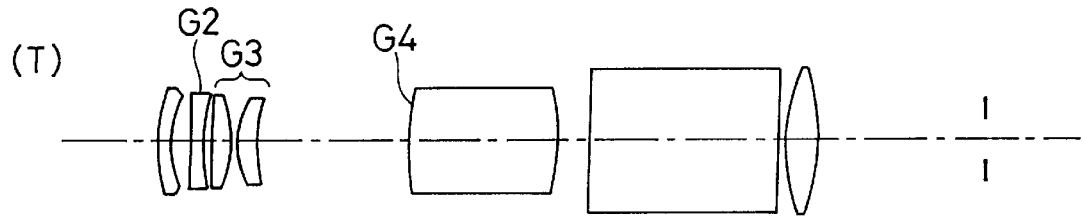
Figure 9A:
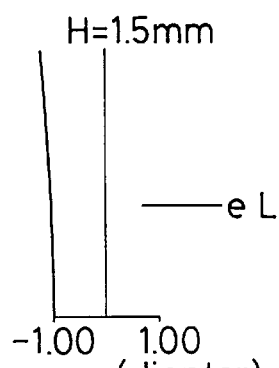
FIGS. 9A to 9C show aberrations of the third embodiment at the shortest focal length condition.
Figure 9B:
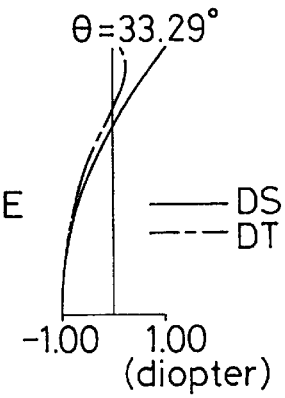
Figure 9C:
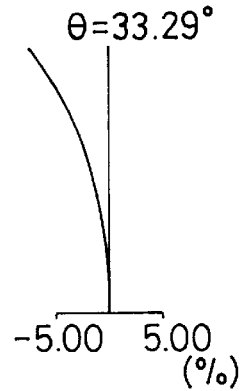
Figure 9D:
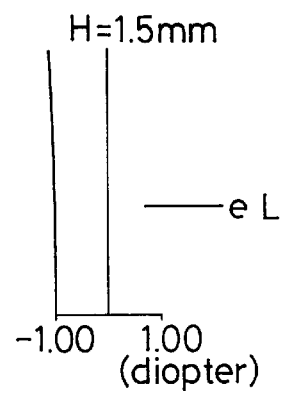
FIGS. 9D to 9F show aberrations of the third embodiment at the middle focal length condition.
Figure 9E:
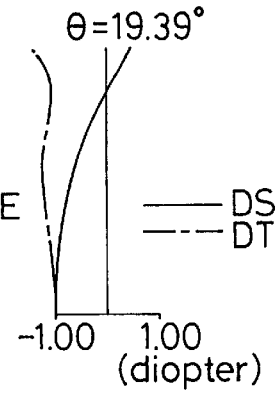
Figure 9F:
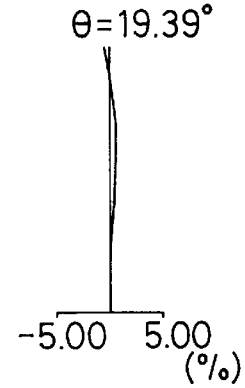
Figure 9G:
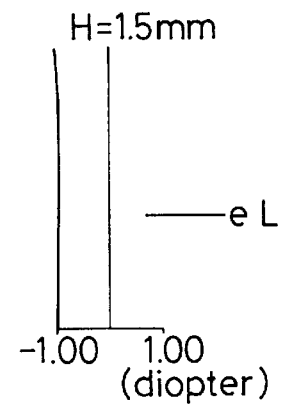
FIGS. 9G to 9I show aberrations of the third embodiment at the longest focal length condition.
Figure 9H:
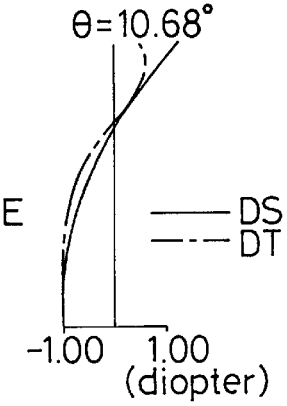
Figure 9I:
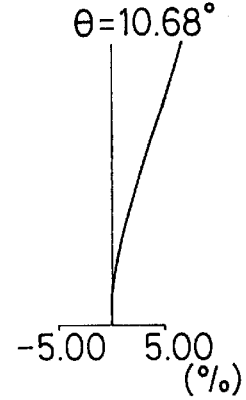

FIGS. 4A to 4C, 6A to 6C and 8A to 8C show the lens arrangements of the first, second and third embodiments, respectively. FIGS. 4A, 6A and 8A show the lens arrangements at the shortest focal length condition (W). FIGS. 4B, 6B and 8B show the lens arrangements at the middle focal length condition (M). FIGS. 4C, 6C and 8C show the lens arrangements at the longest focal length condition (T).

In the first to third embodiments, during zooming from the shortest focal length condition (W) to the longest focal length condition (T), the second lens unit G2 moves toward the side of a pupil EP and then makes a U-turn, and the third lens unit G3 monotonously moves toward the object side along the optical axis AX. Other lens units than the second and third lens units G2 and G3 are stationary during zooming.

The first to third embodiments includes from the object side a negative meniscus lens element concave to the pupil side, a negative bi-concave lens element, a positive bi-convex lens element, a positive meniscus lens element convex to the object side, a bi-convex Porro prism PA, a bi-plano Porro prism PB and a bi-convex eyepiece EL. The negative meniscus lens element concave to the pupil side constitutes the first lens unit G1. The negative bi-concave lens element constitutes the second lens unit G2. The positive bi-convex lens element and the positive meniscus lens element convex to the object side constitute the third lens unit G3. The object side surface (incident surface) of the Porro prism PA constitutes the fourth lens unit G4. The pupil side surface (exit surface) of the Porro prism PA constitutes the condenser lens CL. The objective lens system is constituted by the first to fourth lens units G1 to G4. The image formed surface OI of the objective lens system is located in the vicinity of the exit surface (the surface constituting the condenser lens CL) of the Porro prism PA. The Porro prisms PA and PB each have two reflecting surfaces which are included in the objective lens system and the eyepiece system, respectively.

In the first embodiment, the following surfaces are aspherical: the object side surface of the bi-concave lens element, the pupil side surface of the positive meniscus lens element convex to the object side, the object side surface of the Porro prism PA and the pupil side surface of the eyepiece EL. In the second and third embodiments, the following surfaces are aspherical: both side surfaces of the bi-concave lens element, the pupil side surface of the positive meniscus lens element convex to the object side, the object side surface of the Porro prism PA and the pupil side surface of the eyepiece EL.

Generally, if the number of lens units is increased, the size of the entire lens system increases. In the embodiments according to the present invention, however, the size of the finder is reduced by integrating the fourth lens unit G4 with the Porro prism PA (that is, by forming the fourth lens unit G4 by providing the incident surface of the Porro prism PA with a refractive power). In addition, the condenser lens CL is formed by providing the exit surface of the Porro prism PA with a refractive power, so that the size of the finder is further reduced.

While the Porro prisms PA and PB are used as the erecting optical systems in the embodiments, a combination of a roof prism (or a roof mirror) and a pentaprism (or a pentamirror) or an erecting optical system constituted by a relay optical system may be used.

An autofocus frame and a parallax correction mark are formed on the exit surface (the surface constituting the condenser lens CL) of the Porro prism PA by marking-off (not shown). This is for the following reason. The generation amount of field curvature of the objective lens system is largely increased by a relative increase in pupil aperture due to the realization of a wider angle and a smaller size.

Therefore, aberrations cannot be corrected only by the objective lens system as mentioned above, and it is necessary to correct aberrations by the eyepiece system. Aberrations opposite to the aberrations which cannot be corrected by the objective lens system are generated by the allocation of the curvature of the eyepiece EL, aspherical surfaces, etc. so that the aberrations generated by the objective lens system and the aberrations opposite thereto offset each other. In the above-described embodiments, in view of the fact that the amount of field curvature which is one of the aberrations and the curvature of the condenser lens CL are substantially the same, by locating the marking-off on the surface constituting the condenser lens CL, the deviation of dioptric power of the marking-off in the periphery of the finder is reduced. While in FIGS. 4A, 6A and 8A, the image formed surface OI of the objective lens system is shown as a straight line (alternate long and short dash line), in actuality, the surface is curved at a curvature substantially the same as that of the surface constituting the condenser lens CL.

FIGS. 5A to 5I, 7A to 7I and 9A to 9I show aberrations of the first, second and third embodiments. FIGS. 5A to 5C, 7A to 7C and 9A to 9C show aberrations at the shortest focal length condition. FIGS. 5D to 5F, 7D to 7F and 9D to 9F show aberrations at the middle focal length condition. FIGS. 5G to 5I, 7G to 7I and 9G to 9I show aberrations at the longest focal length condition. H is an exit pupil aperture (mm). θ is a half angle of view (°). The solid line e shows aberration to the e-line. The broken line DT and the solid line DS show astigmatism on the tangential and sagittal surfaces, respectively.

As described above, according to the present invention, in a real-image zoom finder optical system comprising from the object side a positive objective lens system, a positive condenser lens and a positive eyepiece system, the objective lens system includes from the object side a negative first lens unit, a negative second lens unit, a positive third lens unit and a positive fourth lens unit, and the second and third lens units are moved along the optical axis for zooming, so that problems such as the increase in aberrations at the longer focal length condition are not caused and a wide-angle and high-zoom-ratio zoom finder optical system having aberrations being excellently corrected is realized. In addition, by integrating the fourth lens unit with a prism, the size of the finder is reduced.

Obviously, many modifications and variations of the present invention are possible in light of the above teachings. It is therefore to be understood that within the scope of the appended claims, the invention may be practiced other than as specifically described.

TABLE 1

(1st Embodiment)
θ = 33.29 to 10.68, Γ = 0.31 to 1.0794

| Radius of Curvature | | Axial Distance | Refractive Index | | Abbe Number | |
|---|---|---|---|---|---|---|
| r1 | 11.50 | | | | | |
| | | d1 1.00 | N1 | 1.58752 | ν1 | 30.24 |
| r2 | 7.78 | | | | | |
| | | d2 T1 | | | | |
| r3* | −61.51 | | | | | |
| | | d3 1.00 | N2 | 1.58752 | ν2 | 30.24 |
| r4 | 11.23 | | | | | |
| | | d4 T2 | | | | |
| r5 | 16.75 | | | | | |
| | | d5 2.80 | N3 | 1.49329 | ν3 | 57.64 |
| r6 | −9.72 | | | | | |
| | | d6 0.5 | | | | |
| r7 | 5.97 | | | | | |
| | | d7 1.90 | N4 | 1.49329 | ν4 | 57.64 |
| r8* | 9.55 | | | | | |
| | | d8 T3 | | | | |
| r9* | 15.00 | | | | | |
| | | d9 11.13 | N5 | 1.58752 | ν5 | 30.24 |
| r10 | −15.00 | | | | | |
| | | d10 2.50 | | | | |
| r11 | ∞ | | | | | |
| | | d11 14.86 | N6 | 1.58752 | ν6 | 30.24 |
| r12 | ∞ | | | | | |
| | | d12 0.53 | | | | |
| r13 | 13.24 | | | | | |
| | | d13 2.50 | N7 | 1.49329 | ν7 | 57.64 |
| r14* | −12.50 | | | | | |
| | | d14 13.00 | | | | |
| r15 | ∞ (pupil) | | | | | |

Aspherical surface data r3: ε = 9.13                         r8: ε = 2.41
A4 = 3.39 × 10$^{-4}$                A4 = 2.67 × 10$^{-4}$
A6 = −4.65 × 10$^{-6}$               A6 = 6.19 × 10$^{-7}$
A8 = 7.01 × 10$^{-9}$                A8 = 2.05 × 10$^{-8}$ Aspherical surface data r9: ε = −40.83                       r14: ε = −1.76
A4 = 1.37 × 10$^{-4}$                A4 = 3.20 × 10$^{-5}$
A6 = −7.60 × 10$^{-8}$               A6 = 3.24 × 10$^{-6}$
A8 = −9.92 × 10$^{-7}$               A8 = −3.28 × 10$^{-9}$
                                     A10 = −5.00 × 10$^{-10}$ Distance variation due to zooming

| Position | W | M | T |
|---|---|---|---|
| Γ | 0.31 | 0.58 | 1.08 |
| T1 | 2.40 | 7.12 | 4.02 |
| T2 | 13.00 | 3.96 | 0.33 |
| T3 | 0.80 | 5.12 | 11.85 |

Conditions (1), (2)
$f_1/f_2 = 2.826$
$f_3/f_4 = 0.214$

TABLE 2

(2nd Embodiment)
$\theta$ = 33.29 to 9.32, $\Gamma$ = 0.31 to 1.24

| Radius of Curvature | Axial Distance | Refractive Index | Abbe Number |
|---|---|---|---|
| r1   11.50 | | | |
| | d1    1.00 | N1   1.58752 | v1   30.24 |
| r2    7.19 | | | |
| | d2    T1 | | |
| r3*  −34.01 | | | |
| | d3    1.00 | N2   1.58752 | v2   30.24 |
| r4*   15.34 | | | |
| | d4    T2 | | |
| r5    12.04 | | | |
| | d5    1.60 | N3   1.49329 | v3   57.64 |
| r6   −10.84 | | | |
| | d6    0.3 | | |
| r7    5.18 | | | |
| | d7    1.50 | N4   1.49329 | v4   57.64 |
| r8*   6.89 | | | |
| | d8    T3 | | |
| r9*   14.61 | | | |
| | d9    11.38 | N5   1.58752 | v5   30.24 |
| r10  −15.00 | | | |
| | d10   2.50 | | |
| r11   ∞ | | | |
| | d11   14.86 | N6   1.58752 | v6   30.24 |
| r12   ∞ | | | |
| | d12   0.53 | | |
| r13   13.24 | | | |
| | d13   2.50 | N7   1.49329 | v7   57.64 |
| r14* −12.50 | | | |
| | d14   13.00 | | |
| r15   ∞ | (pupil) | | |

Aspherical surface data r3: $\epsilon = 9$
$A4 = 1.73 \times 10^{-4}$
$A6 = -4.14 \times 10^{-6}$
$A8 = 6.17 \times 10^{-9}$ r4: $\epsilon = -3.83$
$A4 = -2.54 \times 10^{-4}$
$A6 = -4.61 \times 10^{-7}$
$A8 = -6.37 \times 10^{-8}$ Aspherical surface data r8: $\epsilon = 3.24$
$A4 = 2.58 \times 10^{-4}$
$A6 = 5.86 \times 10^{-7}$
$A8 = 2.02 \times 10^{-8}$ r9: $\epsilon = -40.31$
$A4 = 2.69 \times 10^{-4}$
$A6 = 2.55 \times 10^{-6}$
$A8 = 7.54 \times 10^{-10}$ r14: $\epsilon = -0.59$
$A4 = 6.00 \times 10^{-5}$
$A6 = 6.09 \times 10^{-6}$
$A8 = -1.82 \times 10^{-8}$ Distance variation due to zooming

| Position | W | M | T |
|---|---|---|---|
| $\Gamma$ | 0.31 | 0.62 | 1.24 |
| T1 | 1.60 | 6.18 | 1.56 |
| T2 | 12.80 | 3.31 | 0.23 |
| T3 | 0.30 | 5.22 | 12.92 |

Conditions (1), (2)
$f_1/f_2 = 2.137$
$f_3/f_4 = 0.213$

TABLE 3

(3rd Embodiment)
$\theta$ = 33.29 to 10.68, $\Gamma$ = 0.31 to 1.0794

| Radius of Curvature | Axial Distance | Refractive Index | Abbe Number |
|---|---|---|---|
| r1   11.50 | | | |
| | d1    1.00 | N1   1.58752 | v1   30.24 |
| r2    6.93 | | | |
| | d2    T1 | | |
| r3*  −68.99 | | | |
| | d3    1.00 | N2   1.58752 | v2   30.24 |
| r4*   12.71 | | | |
| | d4    T2 | | |
| r5    32.15 | | | |
| | d5    1.60 | N3   1.49329 | v3   57.64 |
| r6   −8.36 | | | |
| | d6    0.5 | | |
| r7    5.87 | | | |
| | d7    1.50 | N4   1.49329 | v4   57.64 |
| r8*   10.75 | | | |
| | d8    T3 | | |
| r9*   13.88 | | | |
| | d9    11.85 | N5   1.58752 | v5   30.24 |
| r10  −15.00 | | | |
| | d10   2.50 | | |
| r11   ∞ | | | |
| | d11   14.86 | N6   1.58752 | v6   30.24 |
| r12   ∞ | | | |
| | d12   0.53 | | |
| r13   13.24 | | | |
| | d13   2.50 | N7   1.49329 | v7   57.64 |
| r14* −12.50 | | | |
| | d14   13.00 | | |
| r15   ∞ | (pupil) | | |

Aspherical surface data r3: $\epsilon = 9.05$
$A4 = 1.58 \times 10^{-4}$
$A6 = -4.55 \times 10^{-6}$
$A8 = 7.35 \times 110^{-9}$ r4: $\epsilon = -1.74$
$A4 = -2.20 \times 10^{-4}$
$A6 = 2.86 \times 10^{-7}$
$A8 = -6.37 \times 10^{-8}$ Aspherical surface data r8: $\epsilon = 3.83$
$A4 = 2.64 \times 10^{-4}$
$A6 = 6.82 \times 10^{-7}$
$A8 = 2.03 \times 10^{-8}$ r9: $\epsilon = -37.92$
$A4 = 3.11 \times 10^{-4}$
$A6 = 2.23 \times 10^{-6}$ r14: $\epsilon = -0.7$
$A4 = 5.78 \times 10^{-5}$
$A6 = 5.97 \times 10^{-6}$
$A8 = -1.07 \times 10^{-8}$ Distance variation due to zooming

| Position | W | M | T |
|---|---|---|---|
| $\Gamma$ | 0.31 | 0.58 | 1.08 |
| T1 | 1.60 | 5.44 | 1.57 |
| T2 | 12.00 | 3.54 | 0.60 |
| T3 | 0.50 | 5.13 | 11.93 |

Conditions (1), (2)
$f_1/f_2 = 1.774$
$f_3/f_4 = 0.229$

What is claimed is:

1. A zoom finder optical system of a real image type comprising, from an object side:
   objective lens system of a positive refractive power;
   a condenser lens of a positive refractive power provided near an image formed by said objective lens system; and
   an eyepiece system of a positive refractive power,
   wherein said objective lens system includes from the object side a first lens unit of a negative refractive power, a second lens unit of a negative optical power, a third lens unit of a positive refractive power and a fourth lens unit of a positive refractive power,
   wherein zooming is performed by varying each distance between said first, second, third and fourth lens units.

2. A zoom finder optical system as claimed in claim 1, wherein said second and third lens units are moved along an optical axis during zooming.

3. A zoom finder optical system as claimed in claim 1, wherein said third lens unit includes a plurality of lens elements.

4. A zoom finder optical system as claimed in claim 1, wherein said second lens unit includes at least one aspherical surface.

5. A zoom finder optical system as claimed in claim 1, wherein said third lens unit includes at least one aspherical surface.

6. A zoom finder optical system as claimed in claim 1, wherein said first lens unit is a negative meniscus lens convex to the object side.

7. A zoom finder optical system as claimed in claim 1, wherein said fourth lens unit includes at least one aspherical surface.

8. A zoom finder optical system as claimed in claim 7, wherein a refractive power of the aspherical surface of said fourth lens unit decreases from a center to an edge along a height.

9. A zoom finder optical system as claimed in claim 1, wherein the following condition is fulfilled:

$$1 \leq \frac{f_1}{f_2} \leq 10$$

where $f_1$ is a focal length of the first lens unit and $f_2$ is a focal length of the second lens unit.

10. A zoom finder optical system as claimed in claim 1, wherein the following condition is fulfilled:

$$0.1 \leq \frac{f_3}{f_4} \leq 1$$

where $f_3$ is a focal length of the third lens unit and $f_4$ is a focal length of the fourth lens unit.

11. A zoom finder optical system as claimed in claim 1, wherein said fourth lens unit is not moved during zooming.

12. A zoom finder optical system of a real image type comprising, from an object side:
    an objective lens system having a first lens unit of a negative refractive power;
    a second lens unit of a negative refractive power;
    a third lens unit of a positive refractive power;
    a fourth lens unit of a positive refractive power;
    an erecting optical system including prisms having a plurality of reflecting surfaces; and
    an eyepiece optical system of a positive refractive power,
    wherein zooming is performed by varying each distance between said first, second, third, and fourth lens units,
    wherein the fourth lens unit consists of one convex surface having a positive power; and
    wherein said surface functions as an entrance surface of the prisms provided on the most object side of said erecting optical system.

13. A zoom finder optical system as claimed in claim 12, wherein said second and third lens units are moved along an optical axis during zooming.

14. A zoom finder optical system as claimed in claim 12, wherein said second lens unit includes at least one aspherical surface.

15. A zoom finder optical system as claimed in claim 12, wherein said third lens unit includes at least one aspherical surface.

16. A zoom finder optical system as claimed in claim 12, wherein said first lens unit is a negative meniscus lens convex to the object side.

17. A zoom finder optical system as claimed in claim 12, wherein an object side surface of the erecting optical system is an aspherical surface.

18. A zoom finder optical system as claimed in claim 17, wherein a refractive power of the aspherical surface of the erecting optical system decreases from a center to an edge along a height.

19. A zoom finder optical system as claimed in claim 12, wherein the following condition is fulfilled:

$$1 \leq \frac{f_1}{f_2} \leq 10$$

where $f_1$ is a focal length of the first lens unit and $f_2$ is a focal length of the second lens unit.

20. A zoom finder optical system as claimed in claim 12, wherein the following condition is fulfilled:

$$0.1 \leq \frac{f_3}{f_4} \leq 1$$

where $f_3$ is a focal length of the third lens unit and $f_4$ is a focal length of an object side surface of the erecting optical system.

21. A zoom finder optical system as claimed in claim 12, wherein said erecting optical system includes two Porro prisms.

22. A zoom finder optical system as claimed in claim 21, wherein an image side surface of an object side Porro prism has a refractive power and functions as a condenser lens.

23. A zoom finder optical system of a real image type comprising from an object side a first lens unit of a negative refractive power, a second lens unit of a negative refractive power, a third lens unit of a positive refractive power, a bi-convex Porro prism, a bi-plano Porro prism and an eyepiece system of a positive refractive power,
    wherein the following conditions are fulfilled:

$$1 \leq \frac{f_1}{f_2} \leq 10$$

$$0.1 \leq \frac{f_3}{f_4} \leq 1$$

where $f_1$ is a focal length of the first lens unit, $f_2$ is a focal length of the second lens unit, $f_3$ is a focal length of the third lens unit, and $f_4$ is a focal length of an object side surface of the bi-convex Porro prism.

24. A zoom finder optical system as claimed in claim 23, wherein said second and third lens units are moved along an optical axis during zooming.

25. A zoom finder optical system of a real image type comprising, from an object side:
    an objective lens system having a first lens unit of a negative refractive power;
    a second lens unit of a negative refractive power;
    a third lens unit of a positive refractive power;
    a fourth lens unit of a positive refractive power;
    an erecting optical system including prisms having a plurality of reflecting surfaces; and
    an eyepiece optical system of a positive refractive power,
    wherein zooming is performed by varying each of the distances among said first, second, third, and fourth lens units, and
    wherein the fourth lens unit consists of one convex surface having a positive refractive power, and wherein said surface functions as an entrance surface of the prism provided on the most object side of said erecting optical system.

26. A zoom finder optical system of a real image type comprising, from an object side:

an objective zoom lens system of a positive refractive power;

an erecting optical unit for erecting an image formed by the objective lens system;

a condenser lens of a positive refractive power; and an eyepiece system of a positive refractive power, wherein said objective lens system includes, from the object side, a first lens unit of a negative refractive power, a second lens unit of a negative refractive power, a third lens unit of a positive refractive power, and a fourth lens unit of a positive refractive power, and said second and third lens units are moved along an optical axis during zooming.

27. A finder optical system as claimed in claim 26, wherein the following conditions are fulfilled:

$$1 \leq \frac{f_1}{f_2} \leq 10$$

$$0.1 \leq \frac{f_3}{f_4} \leq 1$$

where $f_1$ is a focal length of the first lens unit, $f_2$ is a focal length of the second lens unit, $f_3$ is a focal length of the third lens unit, and $f_4$ is a focal length of the fourth lens unit.

28. A zoom finder optical system as claimed in claim 26, wherein said fourth lens unit is not moved during zooming.

29. A zoom finder optical system as claimed in claim 26, wherein the second lens unit moves initially toward the image side and subsequently toward the object side from a wide angle position to a telephoto position.

30. A finder optical system of a real image type comprising, from an object side:

an objective zoom lens system of a positive refractive power;

a condenser lens of a positive refractive power, and an eyepiece system of a positive refractive power, wherein said objective lens system includes, from the object side, a first lens unit of a negative refractive power, a second lens unit of a negative refractive power, a third lens unit of a positive refractive power, and a fourth lens unit of a positive refractive power, wherein the second and third lens units are moved along an optical axis to provide a zooming function while the fourth lens unit is fixed during the zooming function, wherein the following conditions are fulfilled:

$$1 \leq \frac{f_1}{f_2} \leq 10$$

$$0.1 \leq \frac{f_3}{f_4} \leq 1$$

where $f_1$ is a focal length of the first lens unit, $f_2$ is a focal length of the second lens unit, $f_3$ is a focal length of the third lens unit, and $f_4$ is a focal length of the fourth lens unit.

31. A finder optical system as claimed in claim 30, wherein the second and third lens units are moved along an optical axis to provide a zooming function while the fourth lens unit is fixed during the zooming function.

* * * * *